(12) United States Patent
Wyle et al.

(10) Patent No.: US 10,489,645 B2
(45) Date of Patent: Nov. 26, 2019

(54) SYSTEM AND METHOD FOR AUTOMATIC DETECTION AND VERIFICATION OF OPTICAL CHARACTER RECOGNITION DATA

(71) Applicant: SUREPREP, LLC, Irvine, CA (US)

(72) Inventors: David Wyle, Corona Del Mar, CA (US); Srinivas Lingineni, Cerritos, CA (US); Will Hosek, Laguna Niguel, CA (US)

(73) Assignee: SUREPREP, LLC, Irvine, CA (US)

( * ) Notice: Subject to any disclaimer, the term of this patent is extended or adjusted under 35 U.S.C. 154(b) by 96 days.

(21) Appl. No.: 15/922,821

(22) Filed: Mar. 15, 2018

(65) Prior Publication Data

US 2019/0286899 A1    Sep. 19, 2019

(51) Int. Cl.
*G06K 9/00* (2006.01)
*G06T 7/13* (2017.01)

(52) U.S. Cl.
CPC ..... *G06K 9/00483* (2013.01); *G06K 9/00463* (2013.01); *G06T 7/13* (2017.01); *G06T 2207/30176* (2013.01)

(58) Field of Classification Search
CPC .............................. G06T 7/13; G06K 9/00463
See application file for complete search history.

(56) References Cited

U.S. PATENT DOCUMENTS

| | | | | |
|---|---|---|---|---|
| 10,229,314 | B1* | 3/2019 | Mitchell | G06K 9/00442 |
| 2002/0037097 | A1* | 3/2002 | Hoyos | G06K 9/00449 |
| | | | | 382/137 |
| 2014/0161365 | A1* | 6/2014 | Acharya | G06K 9/3283 |
| | | | | 382/229 |
| 2016/0055376 | A1* | 2/2016 | Koduru | G06K 9/00449 |
| | | | | 382/176 |

* cited by examiner

*Primary Examiner* — Edward Park
(74) *Attorney, Agent, or Firm* — Snell & Wilmer LLP (57) ABSTRACT

Methods for automatically verifying text detected by optical character recognition (OCR). The method includes obtaining a native digital document having an image layer comprising a matrix of computer-renderable pixels and a text layer comprising computer-readable encodings of a sequence of characters. The method includes obtaining OCR-detected text from the image layer of the native digital document and a pixel-based coordinate location of the OCR-detected text in the image layer of the native digital document. The method includes determining, using a pixel transformation, a computer-interpretable location of the OCR-detected text in the text layer of the native digital document. The method includes detecting text in the text layer based on the computer-interpretable location of the OCR-detected text in the text layer. The method includes rendering only the detected text in the text layer when the OCR-detected text does not match the detected text in the text layer.

20 Claims, 9 Drawing Sheets

100

| PAYER'S name, street address, city or town, state or province, country, ZIP or foreign postal code, and telephone no. BIG COMPANY A 100 BIG COMPANY ST., COMPANYVILLE, USA, 99999-0000 | | Payer's RTN (optional) | |
|---|---|---|---|
| | | 1 Interest income $259.54 | |
| | | 2 Early withdrawal penalty | |
| PAYER'S federal identification number 99-9999999 | RECIPIENT'S identification number *** ** | 3 Interest on U.S. Savings Bonds and | |
| RECIPIENT'S name, street address, city or town, state or province, country, and ZIP or foreign postal code | | 4 Federal income tax withheld | 5 |
| | | 6 Foreign tax paid | 7 |
| | | 8 Tax-exempt interest | 9 |

| PAYER'S name, street address, city or town, state or province, country, ZIP or foreign postal code, and telephone no. 326 328 308 ←<br>BIG COMPANY A<br>100 BIG COMPANY ST.<br>COMPANYVILLE, USA, 99999-0000 | Payer's RTN (optional) 312 | |
|---|---|---|
| | 1 Interest income 322 $259.54 | |
| PAYER'S federal identification number 99-9999999 | RECIPIENT'S identification number *--**** 316 | 2 Early withdrawal penalty |
| RECIPIENT'S name, street address, city or town, state or province, country, and ZIP or foreign postal code | 3 Interest on U.S. Savings Bonds and | |
| | 4 Federal income tax withheld | 5 |
| | 6 Foreign tax paid | 7 |
| | 8 Tax-exempt interest | 9 |

PAYER'S name, street address, city or town, state or province, country, ZIP or foreign postal code, and telephone no.
BIG COMPANY A
100 BIG COMPANY ST.,
COMPANYVILLE, USA, 99999-0000

PAYER'S federal identification number    RECIPIENT'S identification number
99-9999999                                *--

RECIPIENT'S name, street address, city or town, state or province, country, and ZIP or foreign postal code Payer's RTN (optional)

1 Interest income    $259.54 — 330

2 Early withdrawal penalty

3 Interest on U.S. Savings Bonds and    5

4 Federal income tax withheld

6 Foreign tax paid    7

8 Tax-exempt interest    9

704A — PAYER'S name, street address, city or town, state or province, country, ZIP or foreign postal code, and telephone no.
BIG COMPANY A — 704B
100 BIG COMPANY ST.,
COMPANYVILLE, USA, 99999-0000

Payer's RTN (optional) [USE TEXT] — 708

1 Interest income
$259.54 — 706 X

2 Early withdrawal penalty

3 Interest on U.S. Savings Bonds and

PAYER'S federal identification number | RECIPIENT'S identification number
99-9999999 — 704C | *--____

4 Federal income tax withheld | 5

RECIPIENT'S name, street address, city or town, state or province, country, and ZIP or foreign postal code 6 Foreign tax paid | 7

8 Tax-exempt interest | 9

SYSTEM AND METHOD FOR AUTOMATIC DETECTION AND VERIFICATION OF OPTICAL CHARACTER RECOGNITION DATA

BACKGROUND

1. Field

This specification relates to a system and a method for automatically detecting and verifying data obtained by optical character recognition performed on a document.

2. Description of the Related Art

Optical character recognition (OCR) is an electronic conversion of images of text into machine-encoded text. Thus, use of OCR is necessarily rooted in computer technology. In its most common application, OCR is performed on a scanned or photographed document to detect the text of the document. After the text is detected using OCR, the text may be selected, searched, or edited by software executed by a computer. However, OCR may be susceptible to errors, particularly when the image of the document is of poor quality. For example, the lowercase letter "l" may be detected by OCR when the document has a lowercase letter "i" or the number 1. These errors may prevent OCR from being reliably used to efficiently process documents, where accuracy is important. Thus, there is a need for an improved system of detecting text from a document and/or verifying the text detected using OCR.

SUMMARY

What is described is a method for automatically verifying text detected by optical character recognition (OCR). The method includes obtaining a native digital document having an image layer comprising a matrix of computer-renderable pixels and a text layer comprising computer-readable encodings of a sequence of characters. The method includes obtaining an OCR-detected text from the image layer of the native digital document and a pixel-based coordinate location of the OCR-detected text in the image layer of the native digital document. The method includes determining, using a pixel transformation, a computer-interpretable location of the OCR-detected text in the text layer of the native digital document based on the pixel-based coordinate location of the OCR-detected text in the image layer of the native digital document. The method includes applying the computer-interpretable location of the OCR-detected text to the text layer of the native digital document to detect text in the text layer corresponding to the OCR-detected text. The method includes rendering only the detected text in the text layer as an output when the OCR-detected text does not match the detected text in the text layer, to improve accuracy of the output text.

A system for automatically verifying text detected by optical character recognition (OCR) is also described. The system includes an optical character recognition device. The optical character recognition device is configured to receive a native digital document having an image layer comprising a matrix of computer-renderable pixels and a text layer comprising computer-readable encodings of a sequence of characters. The optical character recognition device is also configured to use optical character recognition software to detect text from the image layer of the native digital document and a pixel-based coordinate location of the OCR-detected text in the image layer of the native digital document. The system also includes a verification device configured to determine, using a pixel transformation, a computer-interpretable location of the OCR-detected text in the text layer of the native digital document based on the pixel-based coordinate location of the OCR-detected text in the image layer of the native digital document. The verification device is also configured to apply the computer-interpretable location of the OCR-detected text to the text layer of the native digital document to detect text in the text layer corresponding to the OCR-detected text. The system also includes an output device configured to render only the detected text in the text layer as an output when the OCR-detected text does not match the detected text in the text layer, to improve accuracy of the output text.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems and methods for automatically detecting text or numbers in a native digital document having an image layer and a text layer. More specifically, the systems and methods described herein are an improvement to existing computer technologies for detecting text or numbers in a digital document. As used herein, the term "text" may refer to letters, numbers, symbols, or any other character that may be read by a user. A non-native digital document is one which is created based on a scan or photograph of a physical document and has only an image layer, and a native digital document is one which is created by a computer program and includes an image layer and a text layer.

Optical character recognition (OCR) has conventionally been used in detecting text or numbers in digital representations of physical documents. A user may scan or photograph a physical document to create a digital representation of the document (i.e., a non-native digital document). The non-native digital document may be comprised of a matrix of computer-renderable pixels having various color values, and this non-native digital document has an image layer only. Optical character recognition software is capable of detecting text contained in the non-native digital document based on an analysis of the pixels of the digital document. When the optical character recognition process is completed, a text layer may be added to the image layer of the digital document, so that the document may be searchable, and parts of the text may be copied and pasted to another computer application. The text layer may comprise computer-readable encodings of a sequence of characters representing the characters in the matrix of computer-renderable pixels which make up the image layer.

For example, a physical document that is a letter may be scanned by a digital scanner, and the scanner may create a non-native digital document (e.g., a PDF) with an image layer. The image layer may have a matrix of pixels each having a color value. A computer may receive the non-native digital document and perform optical character recognition on the non-native digital document using optical character recognition software. The optical character recognition software detects all of the text on the non-native digital document based on an analysis of the pixels in the image layer. The optical character recognition software may add a text layer to the non-native digital document containing all of the detected text of the non-native digital document so that the digital document now contains an image layer and a text layer. For example, if the letter contained the words "Dear Arnold," the image layer may have pixels in an arrangement corresponding to the letters of "Dear Arnold," and the text layer may contain text data corresponding to the detected letters of "Dear Arnold," that were detected by the optical character recognition software. However, despite the addition of the text layer by optical character recognition, this digital document remains a non-native digital document, as it did not have its text layer upon creation of the non-native digital document.

When the optical character recognition software scans pixels to detect text of a non-native digital document, the OCR-generated text may be searched, selected, or even edited by computer software. However, depending on the quality of the scan of the physical document, conventional optical character recognition software may be error-prone, and in many cases, a human being may review the results of the optical character recognition to determine whether the optical character recognition software has accurately detected the text or numbers on the physical document. For example, when the original physical document contains the text "illustrations of St. Mark's Square" the optical character recognition software may instead detect "lllustra1on5 of St, Mark;s Square" because of a low-quality scan or a stray mark on the physical page of the physical document. Now, when a user conducts a search of the digital document for "illustration" or "Mark's" the user will not be provided with the correct result.

Some digital documents may be created using computer software (i.e., native digital documents), and not scans or photographs from physical documents. These native digital documents may commonly be in the Portable Document Format (PDF) developed by Adobe®. While PDF is described herein, any digital document format having an image layer and a text layer may be used by the systems and methods described herein. These native digital documents may be created by an originating computer software and converted or output into the digital document format. For example, a user may create a document using Microsoft Word™ and output the document as a PDF. The output PDF may contain an image layer and a text layer. The image layer may be displayed on a display of the computer, and the text layer may be used to search the document or select parts of the text within the document, for example. Again, these digital documents created using computer software and not created based on a physical document may be referred to herein as "native digital documents" or "true digital documents." For example, a PDF created using computer software and not based on a scan of a physical document may be referred to as a "native PDF" or a "true PDF."

These native digital documents have a text layer created from a firsthand input of the intended text from the originating computer software. Accordingly, these native digital documents do not require optical character recognition to detect the text included in the document. Thus, these native digital documents have text in the text layer that is more reliable than a digital document created based on a scan of a physical document and having optical character recognition performed on it (i.e., a "non-native digital document").

While these native digital documents may be improvements over non-native digital documents created based on physical documents, they may still have shortcomings. For example, when data is to be extracted from a form, simply selecting all of the text in the text layer may not provide a suitable data output, as there may be spacing within the text and other objects separating the text, which provides context for the text in the form. An example is shown in FIG. 1.

Figure 1:
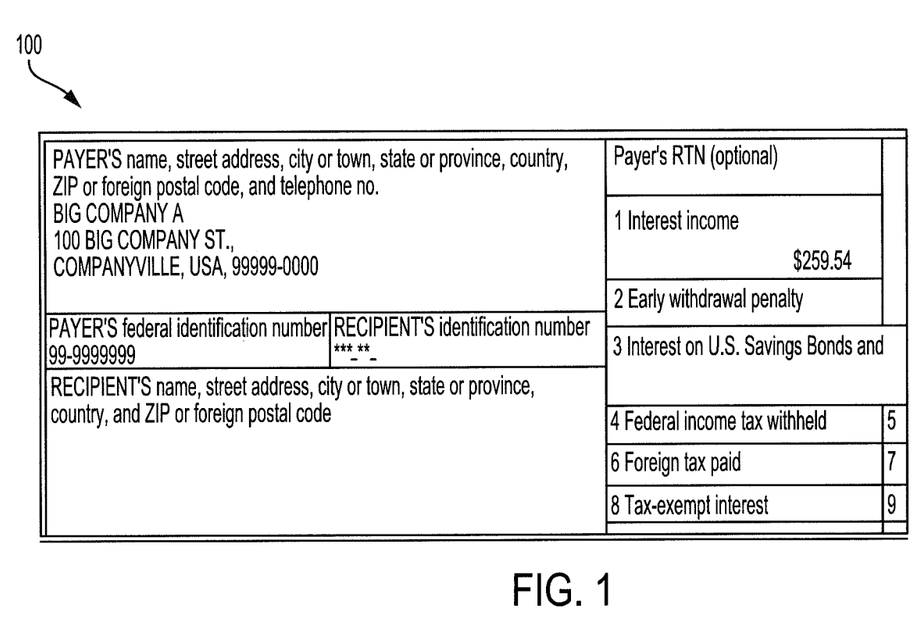
FIG. 1 illustrates an example native digital document, according to embodiments of the invention.

FIG. 1 is a portion of a completed tax form 100. The tax form 100 may be a native digital document created from a computer program, such as payroll management software, and the native digital document includes a text layer and an image layer. The image layer may be viewable by the user on a computer display, and the text layer may be an underlying layer containing all of the text in the document. If the user would like to extract the data from the document, the user could select all of the text (made available by the text layer), and copy and paste the text into another digital document (e.g., a DOC file) or digital data recording system (e.g., a tax return preparation software). However, copying all of the data in the text layer may provide an output of all of the text in the page, without regard for the blocked formatting of the fields. Copying the entire text layer may result in a string of characters similar to:

PAYER'S name, street address, city or town, state of province, country, Payer's RTN (optional) ZIP or foreign postal code, and telephone no. BIG COMPANY A 1 Interest income 100 BIG COMPANY ST., $259.54 COMPANYVILLE, USA 99999-000 2 Early withdrawal penalty PAYER'S federal identification number RECIPIENT'S identification number 3 Interest on U.S. Savings Bonds and 99-999999 *__RECIPIENT'S name, street address, city or town, state or province, 4 Federal income tax withheld 5 country, and ZIP or foreign postal code 6 Foreign tax paid 7 8 Tax-exempt interest 9.

While the accuracy of the text is ensured by the document being a native digital document, the spacing and formatting of the data within the document provides a challenge in being able to readily use the text from the text layer.

Conventionally, this data has been manually processed by a human being using a computer. The human being may select the values of interest in the native digital document and copy and paste the values to another computer program. For example, when preparing a tax return, the human being may manually use a computer mouse to: (1) select the Payer's name and address information, line by line, (2) copy the text to a short-term memory (e.g., a clipboard of the operating system), and (3) paste the text to another computer software (e.g., a tax return preparation program). However, this manual process is tiresome and error-prone. A human being may select the wrong text, not enough text, or may have errors when executing the copy and paste functions of the computer. In addition, correctly identifying the correct text to be copied is also a potential source of errors, as a human being may incorrectly copy the text from an adjacent field (e.g., "Early withdrawal penalty") when intending to copy the text from an intended field (e.g., "Interest income").

Other computer-based systems exist where the image layer of a digital document is analyzed, and using objects present in the document, such as lines and other dividing elements, various text may be detected. In some of these systems, particularly ones for determining values entered into a standardized form, known text present in the document, such as a field description, may be located. A localized search for a corresponding value may then be performed around the area of the known field description. For example, in FIG. 1, the descriptions of the fields (e.g., "Payer's name," "Payer's federal identification number," or "Interest income") may be known by the system. When text corresponding to "Interest income" is sought, the computer system may conduct a local search within a particular number of pixels of the known location of "Interest income" and optical character recognition may be performed on the detected local pixels where text corresponding to "Interest income" is likely to be found.

While this may result in a correct detection of the location of "$259.54" as shown in FIG. 1, because of the potentially unacceptably high error rate of optical character recognition, which may interpret "$259.54" as 5259.54 or $25954 or $2$59.54, a human being may be tasked with reviewing the detected text and comparing it against the digital document displayed on a screen, to ensure the correct value was detected. Again, this human-being-conducted review is prone to error, as the human reviewer may miss errors due to fatigue, poor judgment, lack of motivation, or for any other reason a human being is prone to error.

The systems and methods described herein provide solutions to the errors involved in conventional optical character recognition systems, human processing, and human review systems by using native digital documents, as further described herein. The present invention overcomes many of the deficiencies of the conventional methods and systems and obtains its objectives by providing an integrated method embodied in computer software for use with a computer for the rapid, efficient, and automatic verification of text in a native digital document, thereby allowing for rapid, accurate, and efficient data verification of digital documents. Accordingly, it is the objective of the invention to improve verification of the text of native digital documents, which is integrated with computers for producing accurate verification of digital documents.

Figure 2:
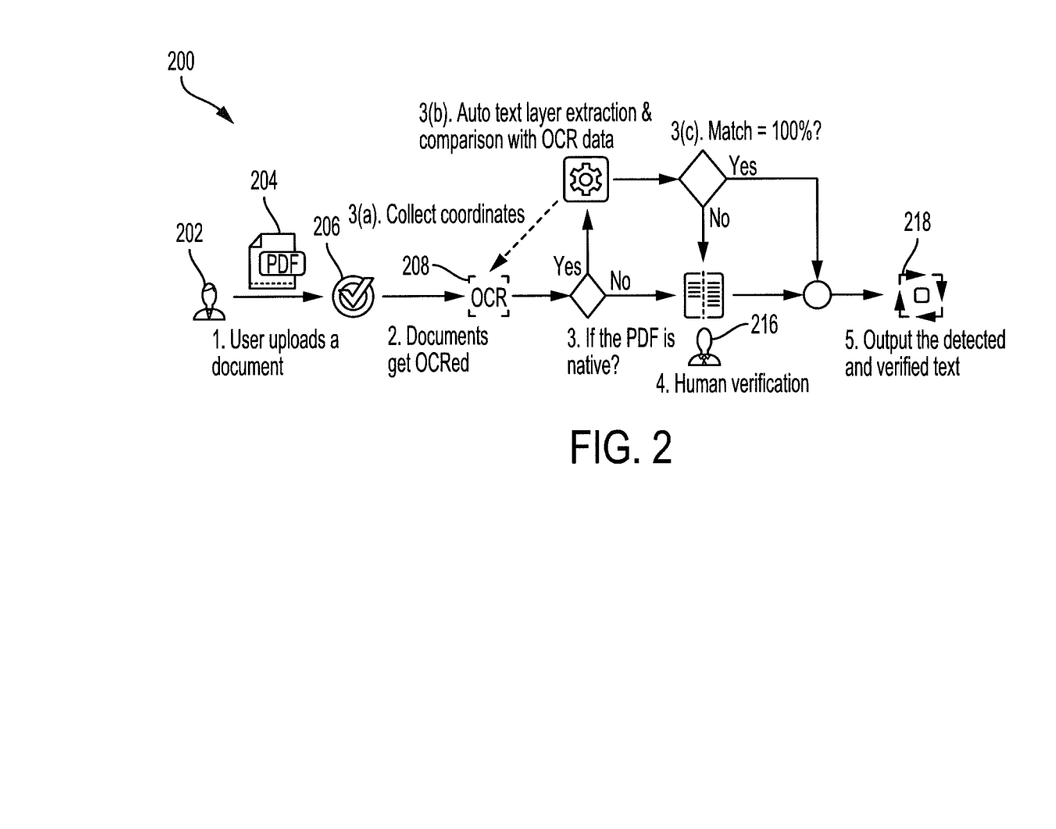
FIG. 2 illustrates a process diagram of a workflow between various components of the system, according to embodiments of the invention.

FIG. 2 illustrates a process diagram of a workflow 200 between various components of the system, according to some embodiments of the invention.

The workflow begins at Step 1 with a user 202 uploading a document 204 to a system 206 using the systems and methods described herein. In some embodiments, the document 204 may be automatically retrieved from a third-party server or automatically communicated by a third-party server. In many embodiments, the document 204 is a form having a plurality of fields, and the system 206 may be configured to determine and use the data corresponding to each of the fields in the document 204. The fields within the document 204 and the identifiers used to label each of the fields in the document 204 may be known to the system 206 before the document 204 is analyzed.

In an example embodiment, the user 202 may be a taxpayer or an automated document retrieval system, the document 204 may be a tax document provided to the taxpayer by an employer or a bank, and the system 206 may be a tax document automation software (or scan and populate software) used by the taxpayer or tax preparer to automate the organization of and data entry from, the taxpayer source documents. The document 204 may contain 25 different fields at different locations in the document 204. The 25 different fields may have unique field identifiers, such as "Payer's name," "Interest income," "Early withdrawal penalty," and "Payer's federal identification number," for example, and each field may have a corresponding value to be determined.

The document 204 may be a native digital document, such as a native PDF, having a text layer and an image layer, or may be a non-native digital document having only an image layer. At Step 2, the document 204 is analyzed and optical character recognition is performed on the image layer of the document 204. The optical character recognition may be performed by an optical character recognition device 208 configured to perform optical character recognition on a given document.

At Step 3, it is determined if the document 204 is a native digital document. An analysis of the metadata associated with the document 204 or an analysis of the content or structure of the document 204 may be performed to determine whether the document 204 is a native digital document. When the document 204 is a non-native digital document, optical character recognition is used to detect the text within the various fields of the document 204, and a human being 216 manually verifies that the correct text was detected by the optical character recognition at Step 4.

When the document 204 is a native digital document, the image layer is analyzed to determine a location of text corresponding to a given field. The given field may be considered search text corresponding with the target text (or sought-after text). For example, in FIG. 1, "Interest income" may be the search text and "$259.54" may be the target text. A list of search text may be provided to the optical character recognition device 208 by the system 206. Coordinates corresponding to the location of the target text is determined (Step 3(a)), as well as an OCR-based detection of the target text. These steps are all performed on the image layer of the document 204. These coordinates may be pixel-based and computer-interpretable, such that a human would be unable to detect the location of the target text based on the coordinates alone.

In Step 3(b), the location of the target text in the text layer is determined based on the coordinates corresponding to the location of the target text in the image layer. In some embodiments, when the coordinates corresponding to the location of the target text in the image layer is in terms of pixels, a pixel transformation converting the pixels to another mapping convention (e.g., dots or points) is used. Once the location of the target text in the text layer is determined, the target text in the text layer is detected.

At Step 3(*c*), the detected text from the text layer is compared with the OCR-based detected text from the image layer. In some embodiments, when the two detected text values do not match, the document 204 is reviewed by a human being 216 at Step 4. In some embodiments, when the two detected text values do not match, the detected text from the text layer is automatically used instead of the detected text from the image layer with no human review.

Once the text is determined, the detected text from the document is output at Step 5. In some embodiments, the detected text is output to another software, such as a spreadsheet software, a database software, or a tax preparation software. In some embodiments, the detected text is stored in a file on a memory of the system. In some embodiments, the detected text is rendered by a computing device and shown on a display screen of the system.

Figure 3A:
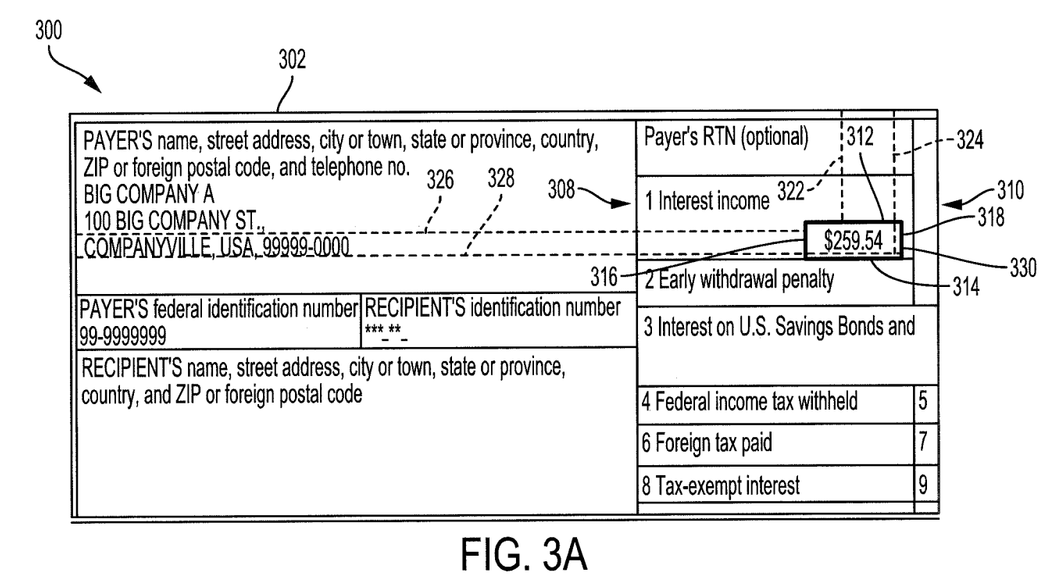
FIG. 3A illustrates the image layer of the native digital document of FIG. 1, according to embodiments of the invention.

FIG. 3A illustrates the image layer 300 of the same native digital document shown in FIG. 1 after an optical character recognition process has been performed on the native digital document 302 to identify a location in the image layer of the target text. The optical character recognition process may be performed by an optical character recognition device, as described herein.

The target text 310 is associated with a search text 308. The search text 308 is known by the optical character recognition device and provided to the optical character recognition device. In particular, the text value and the location of the search text 308 may be known by the optical character recognition device. The optical character recognition device may use the known text value and location of the search text 308 to locate the target text 310.

As shown in FIG. 3A, the search text 308 is "Interest income" and the target text 310 is "$259.54." The optical character recognition device may locate the target text 310 by defining a search area based on the search text 308 and one or more separators present on the document.

In some embodiments, the optical character recognition device identifies data by separating the spaced text in the document to tables. The optical character recognition device locates all of the header text and generates columns based on its respective text. The optical character recognition device then defines a footer element to restrict the table by using a text or separator element. The optical character recognition device is able to detect the data for each respective row based on the location of the determined columns.

In some embodiments, the optical character recognition device detects text appearing multiple times in the document. The optical character recognition device may achieve this by locating the header text and capturing unique data appearing multiple times in the document. Once the unique data is captured, based on the unique element, other required information may be detected by taking the right and left search area of the respective header.

In some embodiments, the optical character recognition device identifies data conforming to a standardized format, such as XXX-XX-XXXX for a social security number, to identify the target text 310.

In some embodiments, the optical character recognition device may know the text value of the target text expected to be on the document based on historical data associated with the document 302 or the user associated with the document 302, and identifies target text 310 that is within a particular percentage match of the expected text value.

Once the target text 310 is located, the optical character recognition device determines location coordinates associated with the location of the target text 310 on the image layer of the native digital document 302. In some embodiments, the location of the target text 310 is represented by a four-sided box 330 surrounding the target text 310, and the coordinates associated with the location of the target text 310 may be a set of four pixel values representing a respective distance from an edge of the native digital document to an edge of the box 330.

For example, the top edge 312 of the box 330 surrounding the target text 310 is a distance 322 away from the top of the digital document 302. The bottom edge 314 of the box 330 surrounding the target text 310 is a distance 324 from the top of the digital document 302. The left edge 316 of the box 330 surrounding the target text 310 is a distance 326 from the left of the digital document 302. The right edge 318 of the box 330 surrounding the target text 310 is a distance 328 from the left of the digital document 302. The coordinate system illustrated herein is merely illustrative, and any system of locating the box 330 in the two-dimensional plane of the image layer of the document 302 may be used.

Once the optical character recognition device has determined the location coordinates associated with the location of the target text 310, the optical character recognition device may output those location coordinates. The optical character recognition device may also detect the target text 310 using optical character recognition on the image layer of the native digital document 302, and output this OCR-detected target text value. These outputs of the optical character recognition device may be in the form of an Extensible Markup Language (XML) file or any other file for communicating metadata.

Figure 3B:
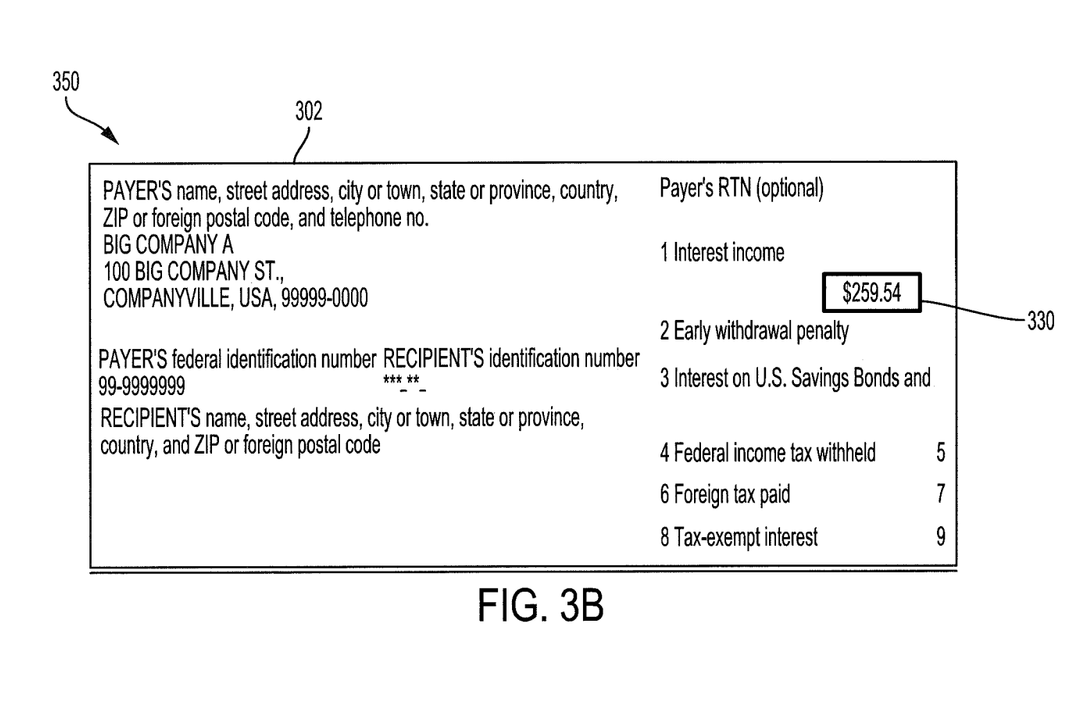
FIG. 3B illustrates the text layer of the native digital document of FIG. 1, according to embodiments of the invention.

FIG. 3B illustrates the text layer 350 of the document 302. Also shown in the box 330, which is not a part of the text layer 350. The text layer contains only the text of the document 302, and is accurate because the document 302 is a native digital document created by computer software. However, as described herein, conventionally a human being is required to select the appropriate text data from the text layer to output or export the text data, as the text of the text layer is essentially one large, unformatted string of text.

Figure 4:
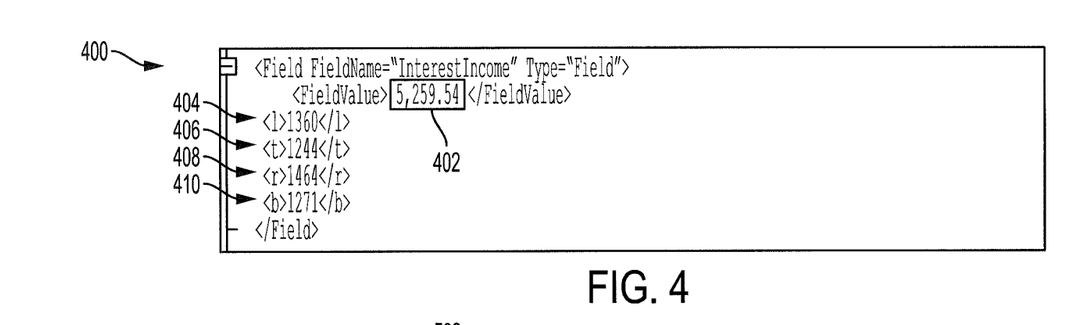
FIG. 4 illustrates an example output XML file of the text and location detected by optical character recognition, according to embodiments of the invention.

FIG. 4 illustrates an example output XML file 400 corresponding to the target text 310. The output XML file 400 is output by the optical character recognition device. The XML file 400 includes OCR-detected text 402 based on optical character recognition of the target text 310. The XML file 400 also includes a left value 404 corresponding to the distance 326 from the left of the digital document 302 to the left side 316 of the box 330, a top value 406 corresponding to the distance 322 from the top of the digital document 302 to the top side 312 of the box 330, a right value 408 corresponding to the distance 328 from the left of the digital document to the right side 318 of the box 330, and a bottom value 410 corresponding to the distance 324 from the top of the digital document to the bottom side 314 of the box 330. The values 404, 406, 408, and 410 may be in pixels or any other unit of measuring a distance on the digital document 302.

As shown in FIG. 4, the OCR-detected text 402 is "5,259.54" but the actual target text is "$259.54." This is an example situation where the optical character recognition device has inaccurately detected a text value. As described herein, conventionally, a human being may, at this point, compare the detected text 402 to the target text 310 and overwrite or correct the detected text 402 to correctly read "$259.54." However, the execution of this verification step by a human being is prone to error, and the systems and methods described herein provide an automatic way to verify whether the detected text 402 is accurate, and an automatic way to determine the correct value of the target text 310.

A verification device receives the OCR-detected text 402, the left value 404, the top value 406, the right value 408, and the bottom value 410. The left value 404, the top value 406, the right value 408, and the bottom value 410 represent the location of the target text 310 within the image layer of the native digital document. In some embodiments, the verification device receives this data in an XML file, as shown in FIG. 4.

The verification device may convert the left value 404, the top value 406, the right value 408, and the bottom value 410 to respective text layer values, if the text layer has a different coordinate or measurement system than the image layer. For example, when the image layer is a matrix of computer-renderable pixels and the values 404-410 are in terms of pixels, the verification device may perform a pixel transformation sequence to convert the values 404-410 in pixels to another digital document mapping convention, such as dots or points. The transformation sequence may not be performed by an individual human without using a computing device because the digital document mapping systems are not replicable on a physical document. The units of pixels, dots, or points, may not be accurately translatable to a physical document, and a physical document may be incapable of representing the computer-specific concepts of pixels, dots, or points.

The digital document mapping conventions used for the native digital document may be more precise than a human being is capable of being. In some embodiments, when the text layer uses the same coordinate or measurement system as the image layer, the same values corresponding to the location of the target text 310 in the image layer may be used for the text layer.

After the verification device determines the location of the target text 310 on the text layer of the native digital document, the verification device detects the text value of the text layer at that location. Referring back to FIG. 3B, the text value of the text layer is shown in box 330. In this case, the text layer has a text value of "$259.54" at the location of the target text 310. The text value detected from the text layer ($259.54) is compared against the text value 402 from the image layer (5,259.54), as detected by the optical character recognition device, and the verification device determines that the text values do not match.

In some embodiments, when the text values do not match, the entire document is flagged for review by a human being. In some embodiments, when the text values do not match, the text value detected from the text layer is used, and the text value 402 from the image layer is discarded or disregarded. The text value detected from the text layer may be output by the verification device. In some embodiments, the text value detected from the text layer is output to another computer software, such as tax preparation software or patient management software. In some embodiments, the text value detected from the text layer is rendered by a computing device and displayed on a display screen for the user to view. In some embodiments, the text value detected from the text layer is saved in a database on a non-volatile memory connected to the verification device. In some embodiments, when the text values exceed a particular threshold percentage of similarity (e.g., 70%, 80%, 85%, 90% similar), the text from the text layer is used, and when the text values do not exceed the threshold percentage of similarity, an alert is generated, and a human being may review the document manually.

The process may be repeated on the document until all of the desired text on the document is detected. The desired text on the document to be detected may be identified by a user. The identification may be a list of names of the values (e.g., Payer Name or Interest Income) and associated search text or associated locations on the document where the desired text may be located.

Figure 5A:
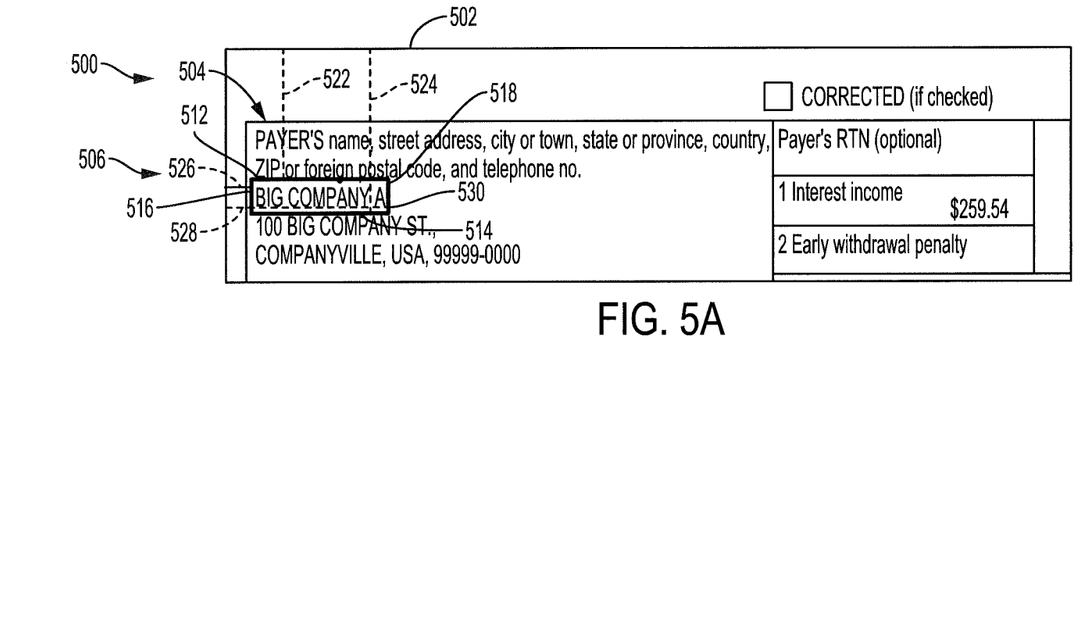
FIG. 5A illustrates the image layer of a native digital document, according to embodiments of the invention.

FIG. 5A illustrates a portion of the native digital document shown in FIG. 1 after an optical character recognition process has been performed on the native digital document 502 to identify a location of the target text 506 in the image layer 500. The optical character recognition process may be performed by an optical character recognition device, as described herein.

The target text 506 is associated with a search text 504. The search text 504 is known by the optical character recognition device and provided to the optical character recognition device. In particular, the text value and the location of the search text 504 may be known by the optical character recognition device. The optical character recognition device may use the known text value and location of the search text 504 to locate the target text 506.

As shown in FIG. 5, the search text 504 is "PAYER's name" and the target text 506 is "BIG COMPANY A." The optical character recognition device may locate the target text 506 by defining a search area based on the search text 504 and one or more separators present on the document.

Once the target text 506 is located, the optical character recognition device determines location coordinates associated with the location of the target text 506 on the image layer 500 of the native digital document 502. In some embodiments, the location of the target text 506 is represented by a four-sided box 530 surrounding the target text 506, and the coordinates associated with the location of the target text 506 may be a set of four pixel values representing a respective distance from an edge of the native digital document to an edge of the box 530.

For example, the top edge 512 of the box 530 surrounding the target text 506 is a distance 522 away from the top of the digital document 502. The bottom edge 514 of the box 530 surrounding the target text 510 is a distance 524 from the top of the digital document 502. The left edge 516 of the box 530 surrounding the target text 510 is a distance 526 from the left of the digital document 502. The right edge 518 of the box 530 surrounding the target text 510 is a distance 528 from the left of the digital document 502.

Once the optical character recognition device has determined the location coordinates associated with the location of the target text 506, the optical character recognition device may output those location coordinates, along with a detected text of the target text 506 using optical character recognition on the image layer of the native digital document 502. These outputs of the optical character recognition device may be in the form of an Extensible Markup Language (XML) file.

Figure 5B:
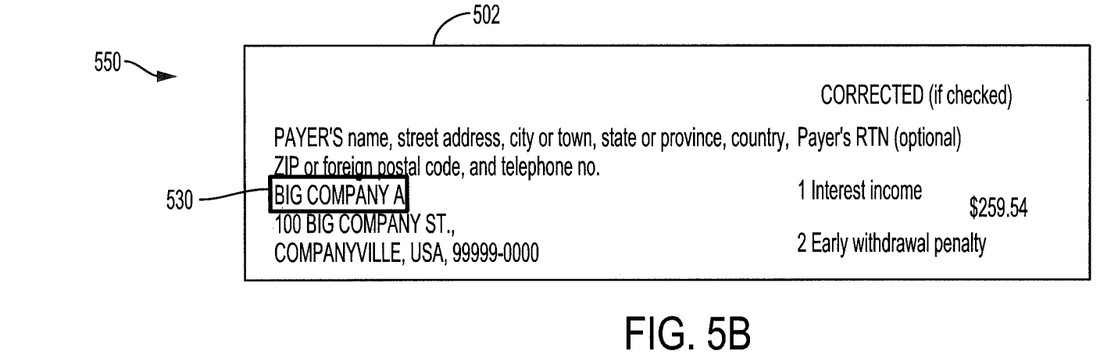
FIG. 5B illustrates the text layer of the native digital document of FIG. 5A, according to embodiments of the invention.

FIG. 5B illustrates the text layer 550 of the native digital document 502. Also illustrated is the box 530 surrounding the target text 506. The box 530 is not a part of the text layer 550. As described herein with respect to FIG. 3B, the text layer 550 contains only the text of the document 502, and is accurate because the document 502 is a native digital document created by computer software. However, as described herein, conventionally a human being is required to select the appropriate text data from the text layer to output or export the text data, as the text of the text layer is essentially one large, unformatted string of text.

Figure 6:
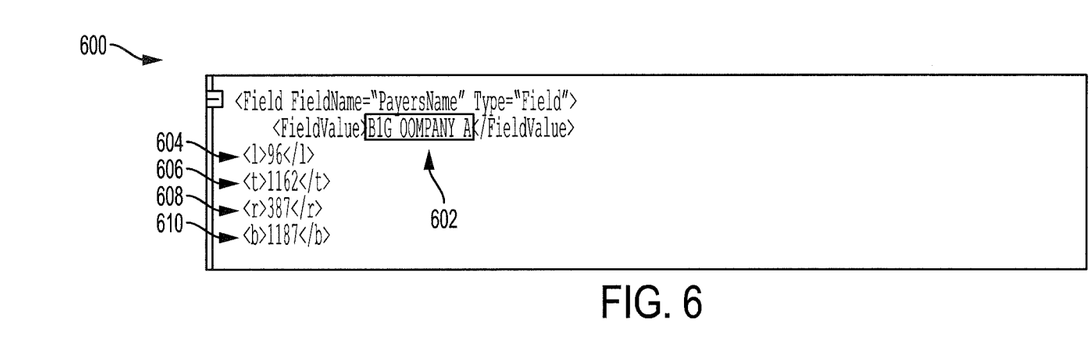
FIG. 6 illustrates an example output XML file of the text and location detected by optical character recognition, according to embodiments of the invention.

FIG. 6 illustrates an example output XML file 600 corresponding to the target text 506. The output XML file 600 is output by the optical character recognition device. The XML file 600 includes a detected text 602 based on optical character recognition of the target text 506. The XML file 600 also includes a left value 604 corresponding to the distance 526 from the left of the digital document 502 to the left side 516 of the box 530, a top value 606 corresponding to the distance 522 from the top of the digital document 502 to the top side 512 of the box 530, a right value 608 corresponding to the distance 528 from the left of the digital document to the right side 518 of the box 530, and a bottom value 610 corresponding to the distance 524 from the top of the digital document to the bottom side 514 of the box 530. The values 604, 606, 608, and 610 may be in pixels or any other unit of measuring a distance on the digital document 502.

As shown in FIG. 6, the detected text 602 is "B1G OOMPANY A" but the actual target text is "BIG COMPANY A." This is an example situation where the optical character recognition device has inaccurately detected a text value. As described herein, conventionally, a human being may, at this point, compare the detected text 602 to the target text 510 and overwrite or correct the detected text 602 to correctly read "BIG COMPANY A." However, the execution of this verification step by a human being is prone to error, and the systems and methods described herein provide an automatic way to verify whether the detected text 602 is accurate, and an automatic way to determine the correct value of the target text 510.

A verification device receives the OCR-detected text 602, the left value 604, the top value 606, the right value 608, and the bottom value 610. The left value 604, the top value 606, the right value 608, and the bottom value 610 represent the location of the target text 510 within the image layer 500 of the native digital document 502. In some embodiments, the verification device receives this data in an XML file, as shown in FIG. 6.

The verification device may convert the left value 604, the top value 606, the right value 608, and the bottom value 610 to respective text layer values, if the text layer has a different coordinate or measurement system than the image layer. When the text layer uses the same coordinate or measurement system as the image layer, the same values corresponding to the location of the target text 510 may be used.

After the verification device determines the location of the target text 506 on the text layer 550 of the native digital document, the verification device detects the text value of the text layer 550 at that location. Referring back to FIG. 5B, the text value of the text layer is shown in box 530. In this case, the text layer has a text value of "BIG COMPANY A" at the location of the target text 506. The text value detected from the text layer (BIG COMPANY A) is compared against the text value 602 from the image layer (B1G OOMPANY A), as detected by the optical character recognition device, and the verification device determines that the text values do not match.

In some embodiments, when the text values do not match, the entire document is flagged for review by a human being. In some embodiments, when the text values do not match, the text value detected from the text layer is used, and the text value 602 from the image layer is discarded or disregarded. The text value detected from the text layer may be output by the verification device. In some embodiments, the text value detected from the text layer is output to another computer software, such as tax preparation software or patient management software. In some embodiments, the text value detected from the text layer is displayed on a display screen for the user to view. In some embodiments, the text value detected from the text layer is saved in a database on a non-volatile memory connected to the verification device.

While the examples illustrated herein have search text uniquely associated with the target text, in some embodiments, the system traverses the native digital document one text item at a time to verify the each of the text items detected by performing optical character recognition in the image layer. That is, in these embodiments, there is no search text, and the steps described herein are repeated as the native digital document is traversed, with the system identifying a new target text with each iteration of the steps. The system may separate groups of text based on the presence of separating elements (e.g., lines or borders), based on the whitespace separating the groups of text, or based on a machine-learning-tuned automatic determination of the type of document represented by the native digital document. For example, over time, and with sufficient training data, the system may be able to recognize various types of documents and may automatically be able to identify the target text locations without being provided the search text associated with each of the target texts.

Figure 7:
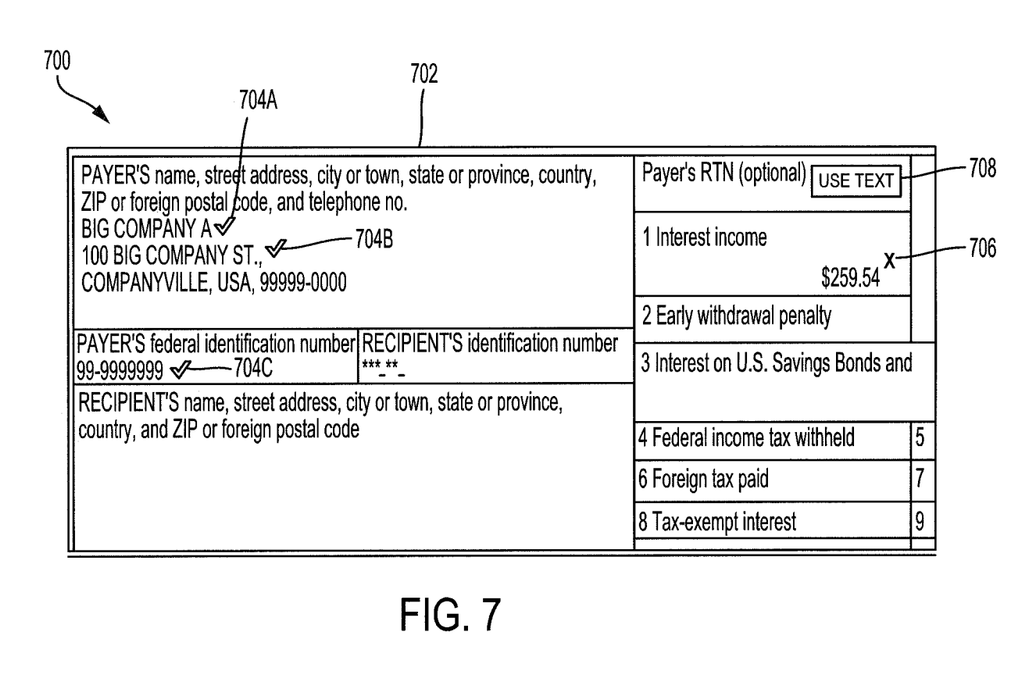
FIG. 7 illustrates an example user interface output after the system has traversed the native digital document, according to embodiments of the invention.

FIG. 7 illustrates an example user interface output after the system has traversed the native digital document 702, according to embodiments of the invention.

A computing device may render a display 700 to be shown on a display screen. The display 700 may be a graphical user interface showing a representation of the native digital document 702. The display 700 may be rendered based on the image layer of the native digital document. The display 700 includes confirmatory indicators 704A-704C and non-confirmatory indicators 706. The confirmatory indicators 704 are located adjacent to text in the native digital document where the OCR-detected text matches with the text in the text layer. For example, when the optical character recognition device detects the Payer name as "BIG COMPANY A" and the corresponding text of the text layer of the native digital document is "BIG COMPANY A", the OCR-detected text matches the text in the text layer. Accordingly, a confirmatory indicator 704A is rendered and displayed adjacent to the text that was confirmed.

The non-confirmatory indicators 706 are located adjacent to text in the native digital document where the OCR-detected text does not match with the text in the text layer. For example, when the optical character recognition device detects the Interest income as being "5259.54" and the corresponding text of the text layer is "$5259.54", the OCR-detected text does not match the text in the text layer. Accordingly, a non-confirmatory indicator 706 is rendered and displayed adjacent to the text that was not confirmed.

The display 700 may be displayed to human reviewers reviewing data extraction from native digital documents. Conventionally, the human reviewers were tasked with viewing extracted data from the native digital document and reviewing the image layer of the native digital document to determine whether the extracted data was accurately detected. For example, the human reviewer reviewing native digital document 702 may have had to go back and forth between the extracted data and the image layer of the native digital document to determine whether each field was properly detected by optical character recognition. This process is prone to error and extremely time consuming. In addition, the human eye may not be capable of detecting some errors. For example, when the OCR-detected text is "BIG COMPANY A" with a Greek capital letter Iota detected instead of an uppercase I, a human being is, in practically all cases, unable to recognize this difference on a document. However, a computer capable of detecting the different ASCII (American Standard Code for Information Interchange) values associated with Greek capital letter Iota and an uppercase I, is able to detect the erroneous detection performed by optical character recognition. This erroneous detection of Greek capital letter Iota instead of uppercase I may result in a mistaken detection of data from the digital document when text data is extracted from the digital document. This may cause inaccuracy and significant delays in the larger systems using the systems and method described herein. For example, a current hospital of a patient may complete a form, using a computer, requesting records of the patient from a previous hospital. If optical character recognition erroneously detects "Patient" with the Greek lowercase letter Alpha instead of lowercase A, in the patient records request form, a significant delay in obtaining the records of the patient may occur, if the records are able to ever be obtained at all. This significant delay or inability to properly locate the patient's records may prevent the current hospital from being able to administer the best care to the patient. This difference between the Greek lowercase letter Alpha instead of lowercase A may be unrecognizable to a human being reviewing dozens of forms every hour, but is easily and readily recognized by the computing devices of the systems and methods described herein.

The display 700 provides a streamlined user interface for the human reviewer by indicating, using the confirmatory indicators 704, which fields have already been confirmed, and indicating, using the non-confirmatory indicators 706, which fields have not been confirmed. This improved display 700 focuses the human reviewer on the fields that the human reviewer should manually review. Conventionally, the human reviewer may have to have two windows open on the display screen—one for the detected text values and one for the image layer of the native digital document. Display 700, which may be shown on a single page of a display screen, allows the human reviewer to view the annotated image layer of the native digital document and to quickly determine which fields to manually check.

In some embodiments, the human reviewer may click, using an input device such as a computer mouse, on the text adjacent to the non-confirmatory indicator 706, and edit the OCR-detected text in real-time. Alternatively, the human reviewer may click an icon 708 directing the system to discard the conflicting OCR-detected text and to use the text from the text layer of the native digital document for any OCR-detected text that does not match the text from the text layer. In some embodiments, the system may use the text from the text layer, disregard or delete the OCR-detected text, and not show the pages for verification if all the required fields are located and their respective text layers extracted.

Figure 8:
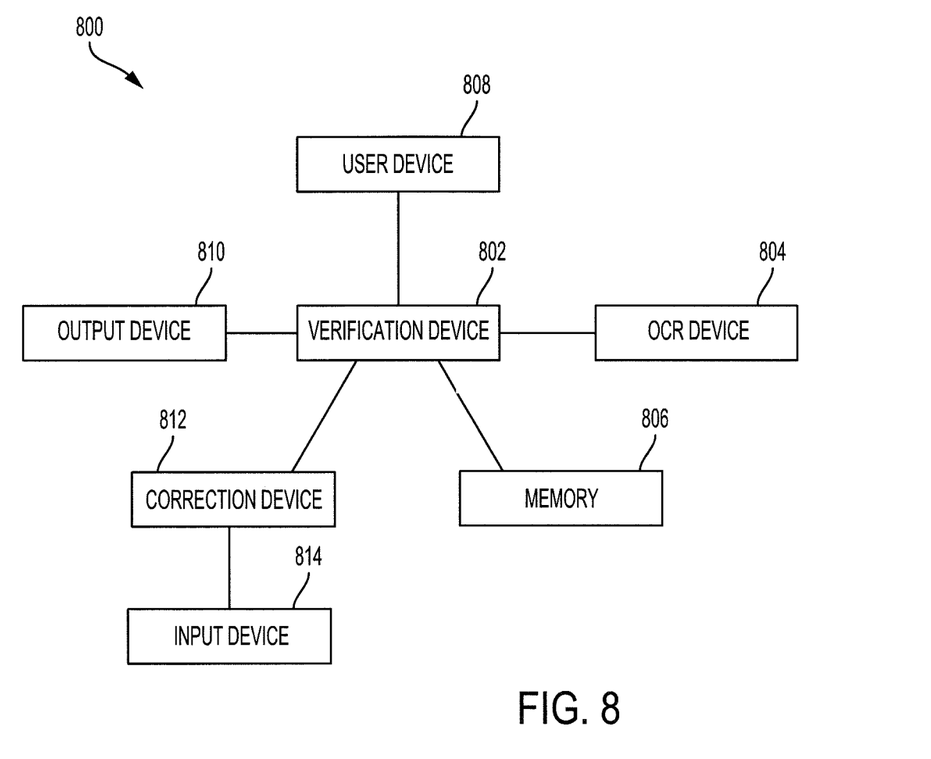
FIG. 8 illustrates an example system for automatically verifying text detected by optical character recognition, according to embodiments of the invention.

FIG. 8 illustrates an example system 800 for automatically verifying text detected by optical character recognition. The system 800 includes a verification device 802, an optical character recognition (OCR) device 804, a memory 806, a user device 808, an output device 810, a correction device 812, and an input device 814.

Any of the devices (e.g., verification device, optical character recognition device, user device, or correction device) described herein may be a separate hardware device having a processor and a non-volatile memory, the processor configured to execute instructions stored on the non-volatile memory. The devices described herein may alternatively be a part of a single device having multiple software devices executed by a processor and a non-volatile memory, the processor configured to execute instructions stored on the non-volatile memory. The devices described herein are special purpose machines configured to perform their respective tasks described herein. In some embodiments, the verification device 802, the optical character recognition device 804, the memory 806, the output device 810, the correction device 812, and the input device 814 are computing modules of a single computing system having a processor and non-transitory memory.

The user device 808 may be a computing device communicatively coupled to the verification device 802. The user device 808 may be, for example, a smartphone, a laptop, or a tablet computer. The user device 808 may have its own display and memory, and is capable of generating a native digital document. For example, the user device 808 may be a computer which has software for generating invoices or account statements in the PDF format, and the generated invoices or account statements contain an image layer and a text layer. The user device 808 may communicate the generated native digital document to the verification device 802 for extraction of the text data within the native digital document.

The verification device 802 may provide the native digital document to the optical character recognition device 804. The optical character recognition device 804 may execute special-purpose optical character recognition software to detect text data in the image layer of the native digital document and the location of the text data in the image layer of the native digital document.

The verification device 802 receives the OCR-detected text and the location of the OCR-detected text from the optical character recognition device 804, and determines the corresponding location of the text values in the text layer of the native digital document. The verification device 802 compares the text value in the text layer to the OCR-detected text, and determines whether the text values match.

The memory 806 may be a non-transitory memory configured to store multiple native digital documents, lists of search text to use for various different types of documents, or any other data described herein.

The output device 810 may be a display screen configured to display the results of the verification of text values between the OCR-detected text and the text detected from the text layer of the native digital document. The display screen may display the image layer of the native digital document and may also display icons where the OCR-detected text was verified (e.g., a green check mark) and where the OCR-detected text was not verified (e.g., a red X mark). In this way, a system requiring human being review of the document when the OCR-detected text does not match the text layer text can be performed more accurately, as the system is capable of automatically verifying at least a portion of the native digital document.

The output device 810 may be a separate computing device executing software which collects or uses the text detected from the native digital document. For example, the output device 810 may be a computing device of a tax return preparation service, which processes tax documents received by a user, extracts the data from the tax documents, and either stores the text data or populates one or more tax-related forms based on the text data of the tax documents. In another example, the output device 810 is a computing device executing database software, and the extracted data may be organized and stored by the database software.

The correction device 812 may render a graphical user interface to be displayed on the output device 810. The graphical user interface rendered by the correction device 812 may be similar to display 700 of FIG. 7. The correction device 812 may provide for a human review and correction of any OCR-detected text that does not match the corresponding text in the text layer. The correction device 812 may receive, from an input device 814, an indication from the user to adjust or correct the OCR-detected values to a value entered by the user or to the value of the text layer. The input device 814 may be one or more of a computer mouse, a computer keyboard, a microphone, or any other device or apparatus for communicating with the system 800.

Figure 9:
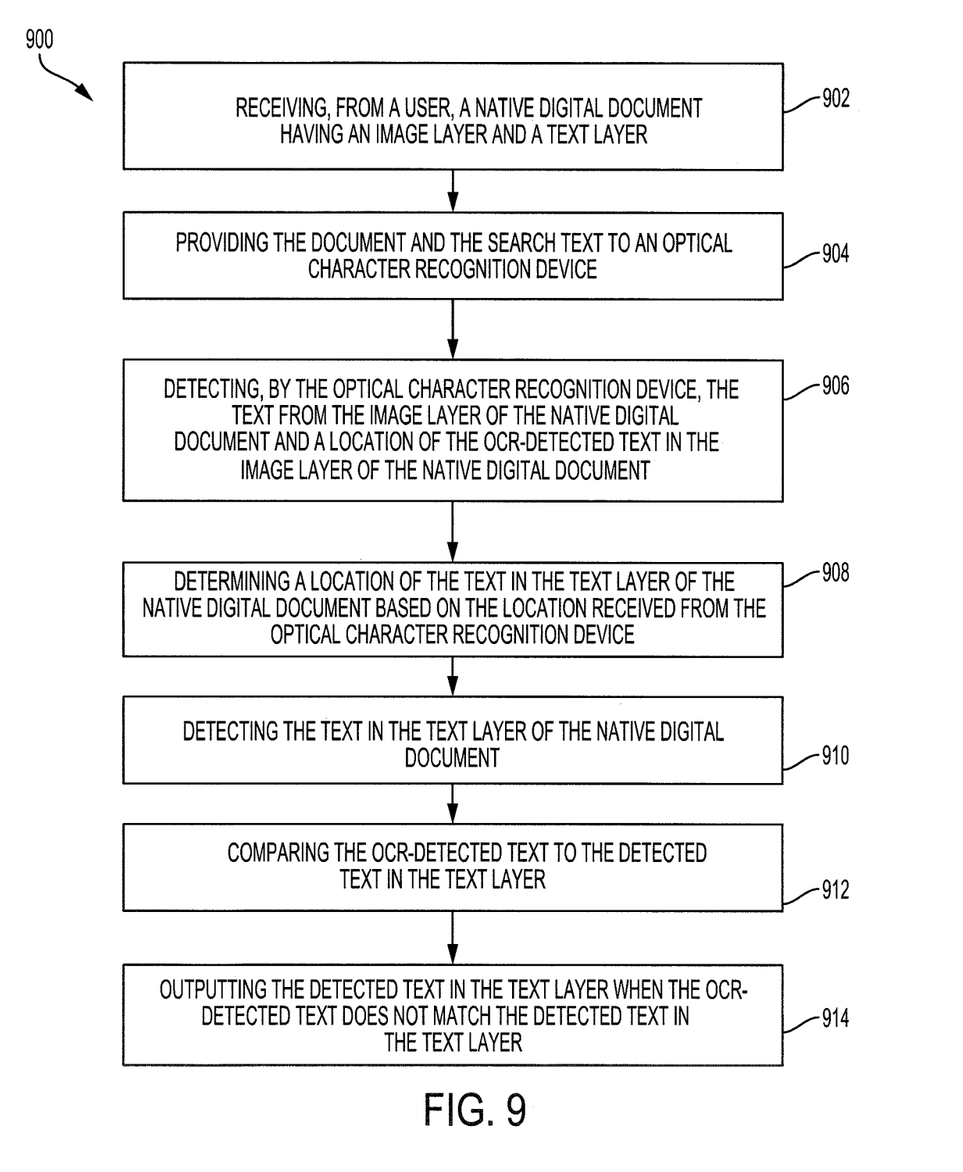
FIG. 9 illustrates a flow diagram of a process of automatically verifying text detected by optical character recognition, according to embodiments of the invention.

FIG. 9 illustrates a flow diagram of a process 900 used by the system described herein. The system receives, from a user, a native digital document having an image layer and a text layer (step 902). As described herein, the user device 808 may communicate the native digital document to the verification device 802.

The native digital document is provided to an optical character recognition device 804 (step 904), which detects text in the image layer of the native digital document and a location of the text in the image layer (step 906).

The verification device 802 determines a location of the text in the text layer of the native digital document based on the location received from the optical character recognition device 804 (step 908). The text in the text layer may be considered reliable, as the document is a native digital document.

The verification device 802 detects the text in the text layer of the native digital document (step 910) and compares the OCR-detected text to the text in the text layer of the native digital document (step 912). When the OCR-detected text does not match the text in the text layer of the native digital document, the text from the text layer may be output (step 914). In addition, an indication that the two values did not match may be displayed on a user interface. When the OCR-detected text does match the text in the text layer of the native digital document, the text from the text layer may be output. In addition, an indication that the two values did match may be displayed on a user interface.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for automatically verifying text detected by optical character recognition (OCR), the method comprising:
    obtaining a native digital document having an image layer comprising a matrix of computer-renderable pixels and a text layer comprising computer-readable encodings of a sequence of characters;
    obtaining an OCR-detected text from the image layer of the native digital document and a pixel-based coordinate location of the OCR-detected text in the image layer of the native digital document;
    determining, using a pixel transformation, a computer-interpretable location of the OCR-detected text in the text layer of the native digital document based on the pixel-based coordinate location of the OCR-detected text in the image layer of the native digital document;
    applying the computer-interpretable location of the OCR-detected text to the text layer of the native digital document to detect text in the text layer corresponding to the OCR-detected text; and
    rendering only the detected text in the text layer as an output when the OCR-detected text does not match the detected text in the text layer, to improve accuracy of the output text.

2. The method of claim 1, wherein the OCR-detected text and the pixel-based coordinate location of the OCR-detected text in the image layer is determined by an optical character recognition device executing optical character recognition computer software.

3. The method of claim 1, wherein the pixel-based coordinate location of the OCR-detected text in the image layer is associated with a four-sided box surrounding the OCR-detected text, the four-sided box having a left side, a top side, a right side, and a bottom side.

4. The method of claim 3, wherein the pixel-based coordinate location of the OCR-detected text in the image layer includes a left value corresponding to a distance from a left edge of the native digital document to the left side of the four-sided box, a top value corresponding to a distance from the top edge of the native digital document to the top side of the four-sided box, a right value corresponding to a distance from the left edge of the native digital document to the right side of the four-sided box, and a bottom value corresponding to a distance from the top edge of the native digital document to the bottom side of the four-sided box.

5. The method of claim 1, further comprising providing a display of the image layer of the native digital document and a confirmatory indicator adjacent to the location of the OCR-detected text when the OCR-detected text matches the detected text in the text layer or a non-confirmatory indicator adjacent to the location of the OCR-detected text when the OCR-detected text does not match the detected text in the text layer.

6. The method of claim 5, further comprising:
    determining, for each text of the native digital document, whether an OCR-detected text for each text matches a corresponding text in the text layer, and
    providing, on the display, a respective confirmatory indicator for each text where the OCR-detected text matches the corresponding text in the text layer, and a respective non-confirmatory indicator for each text where the OCR-detected text does not match the corresponding text in the text layer,
    wherein the display is limited to a single page of a display screen.

7. The method of claim 5, further comprising receiving, in real-time from the user via an input unit, a correction for the OCR-detected text when the OCR-detected text does not match the detected text in the text layer.

8. The method of claim 1, wherein the native digital document is obtained by receiving the native digital document from a user device of the user, by receiving the native digital document from a third-party server, or by retrieving the native digital document from the third-party server.

9. The method of claim 1, further comprising discarding or deleting the OCR-detected text when the OCR-detected text does not match the detected text in the text layer.

10. The method of claim 1, further comprising automatically outputting, to a computer software, the detected text in the text layer to improve accuracy of text extraction from the native digital document.

11. A system for automatically verifying text detected by optical character recognition (OCR), the system comprising:
an optical character recognition device configured to:
receive a native digital document having an image layer comprising a matrix of computer-renderable pixels and a text layer comprising computer-readable encodings of a sequence of characters, and
use optical character recognition software to detect text from the image layer of the native digital document and a pixel-based coordinate location of the OCR-detected text in the image layer of the native digital document;
a verification device configured to:
determine, using a pixel transformation, a computer-interpretable location of the OCR-detected text in the text layer of the native digital document based on the pixel-based coordinate location of the OCR-detected text in the image layer of the native digital document, and
apply the computer-interpretable location of the OCR-detected text to the text layer of the native digital document to detect text in the text layer corresponding to the OCR-detected text; and
an output device configured to render only the detected text in the text layer as an output when the OCR-detected text does not match the detected text in the text layer, to improve accuracy of the output text.

12. The system of claim 11, wherein the OCR-detected text and the pixel-based coordinate location of the OCR-detected text in the image layer is determined by an optical character recognition device executing optical character recognition computer software.

13. The system of claim 12, further comprising a correction device connected to the verification device and configured to receive, in real-time from the user via an input unit, a correction for the OCR-detected text when the OCR-detected text does not match the detected text in the text layer.

14. The system of claim 11, wherein the pixel-based coordinate location of the OCR-detected text in the image layer is associated with a four-sided box surrounding the OCR-detected text, the four-sided box having a left side, a top side, a right side, and a bottom side.

15. The system of claim 14, wherein the pixel-based coordinate location of the OCR-detected text in the image layer includes a left value corresponding to a distance from a left edge of the native digital document to the left side of the four-sided box, a top value corresponding to a distance from the top edge of the native digital document to the top side of the four-sided box, a right value corresponding to a distance from the left edge of the native digital document to the right side of the four-sided box, and a bottom value corresponding to a distance from the top edge of the native digital document to the bottom side of the four-sided box.

16. The system of claim 11, wherein the output device is further configured to provide a display of the image layer of the native digital document and a confirmatory indicator adjacent to the location of the OCR-detected text when the OCR-detected text matches the detected text in the text layer or a non-confirmatory indicator adjacent to the location of the OCR-detected text when the OCR-detected text does not match the detected text in the text layer.

17. The system of claim 16, wherein the verification device is further configured to determine, for each text of the native digital document, whether an OCR-detected text for each text matches a corresponding text in the text layer,
wherein the output device is further configured to provide, on the display, a respective confirmatory indicator for each text where the OCR-detected text matches the corresponding text in the text layer, and a respective non-confirmatory indicator for each text where the OCR-detected text does not match the corresponding text in the text layer, and
wherein the display is limited to a single page of a display screen.

18. The system of claim 11, wherein the native digital document is received from a user device of the user, received from a third-party server, or retrieved from the third-party server.

19. The system of claim 11, wherein the verification device is further configured to discard or delete the OCR-detected text when the OCR-detected text does not match the detected text in the text layer.

20. The system of claim 11, wherein the verification device is further configured to automatically output, to a computer software, the detected text in the text layer to improve accuracy of text extraction from the native digital document.

* * * * *